(12) United States Patent
Conner et al.

(10) Patent No.: US 7,961,202 B2
(45) Date of Patent: Jun. 14, 2011

(54) METHOD AND APPARATUS FOR MAINTAINING A VISUAL APPEARANCE OF AT LEAST ONE WINDOW WHEN A RESOLUTION OF THE SCREEN CHANGES

(75) Inventors: Michael James Conner, Kanata (CA); Paul Andrew Erb, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 841 days.

(21) Appl. No.: 11/978,077

(22) Filed: Oct. 26, 2007

(65) Prior Publication Data
US 2009/0109244 A1    Apr. 30, 2009

(51) Int. Cl.
*G09G 5/00* (2006.01)
*G06F 3/048* (2006.01)

(52) U.S. Cl. ........................................ 345/660; 715/800
(58) Field of Classification Search .................. 715/800; 345/660
See application file for complete search history.

(56) References Cited

U.S. PATENT DOCUMENTS

| 5,434,964 | A | * | 7/1995 | Moss et al. ..................... 715/788 |
| 5,459,825 | A | * | 10/1995 | Anderson et al. ............. 715/815 |
| 6,873,343 | B2 | * | 3/2005 | Chui ............................. 345/667 |
| 7,489,324 | B2 | * | 2/2009 | Royal et al. ................... 345/667 |
| 7,712,045 | B2 | * | 5/2010 | LeMay et al. ................. 715/788 |
| 2002/0044156 | A1 | | 4/2002 | Maezawa et al. |
| 2002/0075289 | A1 | | 6/2002 | Hatori et al. |
| 2003/0076340 | A1 | | 4/2003 | Hatori et al. |

FOREIGN PATENT DOCUMENTS

JP    2004-152034    5/2004
JP    2004-152034  * 5/2010

* cited by examiner

*Primary Examiner* — Ryan R Yang

(57) ABSTRACT

A method and apparatus for maintaining a visual appearance of at least one window displayed on a screen after a change in a resolution of the screen includes a first step of receiving a display change notice indicative that the resolution of the screen is to be changed from a current screen resolution to a new screen resolution. A second step of determining the current screen resolution. A third step of determining the new screen resolution. A fourth step of generating at least one scaling factor based on the current screen resolution and the new screen resolution. A fifth step of transmitting a windows resize to a window drawing module for triggering drawing the window on the screen using the new visual parameters when the resolution changes from the current screen resolution to the new screen resolution.

17 Claims, 4 Drawing Sheets

METHOD AND APPARATUS FOR MAINTAINING A VISUAL APPEARANCE OF AT LEAST ONE WINDOW WHEN A RESOLUTION OF THE SCREEN CHANGES

FIELD OF INVENTION

The specification relates generally to display screens, and specifically to a method and apparatus for maintaining a visual appearance of at least one window displayed on a screen when a resolution of the screen changes.

BACKGROUND OF THE INVENTION

A common occurrence among computer users is to change the resolution of the screen upon which is displayed visual information pertinent to the user, the screen acting as the primary human machine interface (HMI) to the computer. Many computer systems use a windows based environment to display information. Unfortunately, when the resolution of the screen is changed, the position and size of the windows displayed on the screen change as well. However, while the user may desire a change in the resolution, the user may not desire a change in the visual appearance of the windows displayed on the screen. For example, a user may change the resolution to achieve a desired visual appearance of the desktop (e.g. larger or smaller icons), but may not wish to impact other visual aspects of the computing environment. While the user may change the position and size of the windows once the resolution has been changed, this is not always convenient, especially if a large number of windows are displayed, and furthermore the user may not have permission to resize and/or reposition each window.

In some instances, the screen being used may have a frame having a mechanical HMI (e.g. buttons, switches, fingerprint scanners etc) to trigger certain functions within the computing environment. Alternatively, an appliance with a mechanical HMI may be attached to the frame, and connected to the computer for a similar purpose. In these instances a taskbar may be programmed to appear on the screen adjacent to the mechanical HMI, for example, for labelling and/or configuring the response of the mechanical HMI. A change in screen resolution will alter the visual appearance of such a taskbar so that the taskbar is no longer aligned with the mechanical HMI.

SUMMARY OF THE INVENTION

A first broad aspect of an embodiment seeks to provide a method of maintaining a visual appearance of at least one window displayed on a screen when a resolution of the screen changes from a current screen resolution to a new screen resolution, comprising: generating at least one scaling factor based on the current screen resolution and the new screen resolution, the at least one scaling factor for generating new visual parameters by scaling current visual parameters, the new visual parameters for drawing the at least one window on the screen when the resolution changes from the current screen resolution to the new screen resolution; and triggering the drawing the at least one window on the screen using the new visual parameters when the resolution changes from the current screen resolution to the new screen resolution. In some of these embodiments, the method further comprises determining the current visual parameters and generating the new visual parameters by scaling the current visual parameters using the at least one scaling factor. Further, in some of these embodiments, determining the current visual parameters comprises requesting the current visual parameters from one of an application associated with the at least one window and a windows manager.

In some embodiments of the first broad aspect, the current screen resolution comprises a current vertical resolution and a current horizontal resolution, and the new screen resolution comprises a new vertical resolution and a new horizontal resolution, the generating the at least one scaling factor comprising: generating a vertical scaling factor by dividing the new vertical resolution by the current vertical resolution; and generating a horizontal scaling factor by dividing the new horizontal resolution by the current horizontal resolution. In some of these embodiments, only one of the generating the vertical scaling factor and the generating the horizontal scaling factor occurs if a change in the vertical resolution is similar to a change in the horizontal resolution.

In other embodiments of the first broad aspect, the current visual parameters comprise: a vertical position of a reference point associated with the at least one window relative to a reference point on the screen; a horizontal position of the reference point associated with the at least one window relative to the reference point on the screen; a height of the at least one window; and a width of the at least one window. In some of these embodiments, the generating at least one scaling factor is based on the current screen resolution and the new screen resolution comprises generating a vertical scaling factor and a horizontal scaling factor, and the generating new visual parameters by scaling the current visual parameters comprises multiplying the vertical position of a reference point associated with the at least one window relative to a reference point on the screen, and the a height of the at least one window by the vertical scaling factor, and multiplying the horizontal position of the reference point associated with the at least one window relative to the reference point on the screen, and the width of the at least one window by the horizontal scaling factor.

In further embodiments of the first broad aspect, units of the current visual parameters and the new visual parameters are pixels.

In yet further embodiments of the first broad aspect, the method further comprises determining if the new screen resolution is suitable for maintaining the visual appearance of the at least one window displayed on the screen when the resolution changes from the current screen resolution to the new screen resolution. In some of these embodiments, the method further comprises determining a minimum resolution below which the visual appearance of the at least one window is negatively impacted, wherein the determining if the new screen resolution is suitable comprises determining if the new screen resolution is less than the minimum resolution. In some of these embodiments, determining the minimum resolution comprises requesting the minimum resolution from an application associated with the at least one window.

In other embodiments of the first broad aspect, the method comprises determining the current screen resolution by requesting the current screen resolution from one of an application associated with the at least one window and a windows manager.

In other embodiments of the first broad aspect, the method further comprises receiving a display change message indicative that the resolution of the screen is to be changed, the display change message comprising the new screen resolution.

In further embodiments of the first broad aspect, the method further comprises determining the new screen resolution by requesting the new screen resolution from one of an application associated with the at least one window and a windows manager.

In yet further embodiments of the first broad aspect, the method further comprises transmitting a windows resize trigger to a window drawing module, the windows resize trigger comprising the at least one scaling factor, and configured for triggering the window drawing module to determine the current visual parameters and generate the new visual parameters by scaling the current visual parameters using the at least one scaling factor.

A second broad aspect of an embodiment seeks to provide a computing device for maintaining a visual appearance of at least one window displayed on a screen coupled to the computing device when a resolution of the screen changes from a current screen resolution to a new screen resolution. The computing device comprises a memory for storing a windows manager, a window drawing module for drawing the at least one window, and an automatic resize detection application, the automatic resize detecting application configured for: generating at least one scaling factor based on the current screen resolution and the new screen resolution, the at least one scaling factor for generating new visual parameters by scaling current visual parameters, the new visual parameters for drawing the at least one window on the screen when the resolution changes from the current screen resolution to the new screen resolution; and triggering the window drawing module to draw the at least one window on the screen using the new visual parameters when the resolution changes from the current screen resolution to the new screen resolution. The computing device further comprises a processor for processing the windows manager, the window drawing module, and the automatic resize detection application. In some of these embodiments, the automatic resize detection application is further configured for determining the current visual parameters and generating the new visual parameters by scaling the current visual parameters using the at least one scaling factor.

In other embodiments of the second broad aspect, the window drawing module is configured to determine the current visual parameters and generate the new visual parameters by scaling the current visual parameters using the at least one scaling factor.

In further embodiments of the second broad aspect, the memory further stores an application comprising the automatic resize detection application.

In yet further embodiments of the second broad aspect, the automatic resize detection application is further configured for transmitting a windows resize trigger to the window drawing module to effect the triggering the window drawing module to draw the at least one window on the screen.

BRIEF DESCRIPTION OF THE DRAWINGS

Embodiments are described with reference to the following figures, in which.

DETAILED DESCRIPTION

Figure 1:
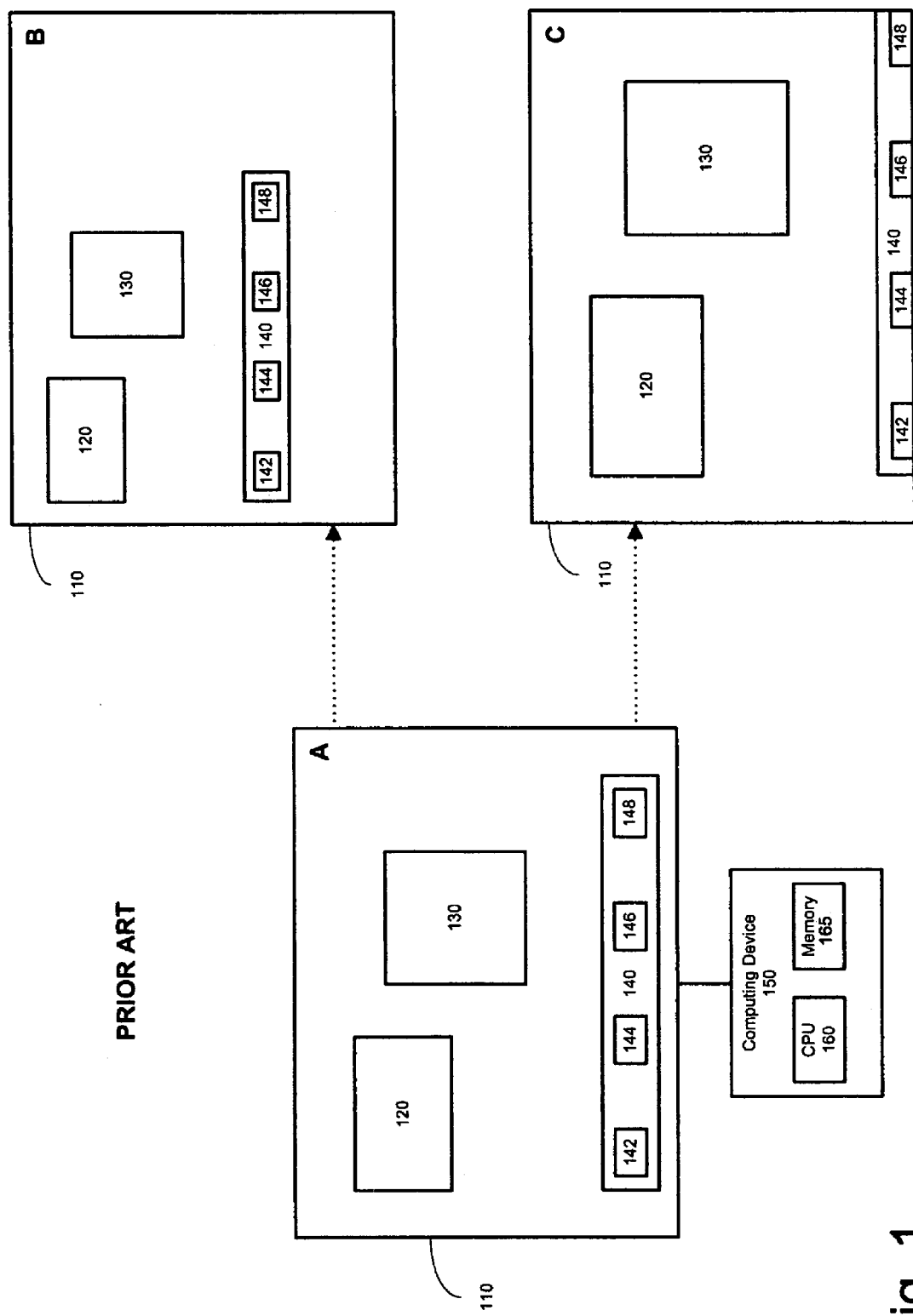
FIG. 1 depicts the effect of a change in the resolution of a screen on the visual appearance of windows displayed on the screen, according to the prior art.

In order to more fully illustrate the problems with the prior art, reference is made to FIG. 1, which depicts the effect of a change in the resolution of a display screen 110 on the visual appearance of windows 120, 130 and 140 displayed on the screen 110, according to the prior art. Window 140 further comprises graphic objects 142, 144, 146 and 148. The resolution of the screen 110 is generally described with respect to the number of pixels displayed in width and height, for example 1280×1024 meaning the screen 110 comprises 1280 pixels in width and 1024 pixels in height. The screen 110 also has a physical area (i.e. a physical height and width). The screen 110 is in communication with a computing device 150, which is generating and managing the image displayed on the screen 110. The computing device 150 comprises a CPU 160 for processing data (e.g. software), and a memory 165 for storing data (e.g. software). Further details of the computing device 150 are described with reference to FIG. 2. In general, the windows and graphic objects displayed on the screen 110 are comprised of pixels, as known to one of skill in the art.

When the screen 110 is in a state labelled "A" in FIG. 1, the windows 120, 130 and 140 have a size and position relative to a reference point on the screen 110, for example an edge, corner or centre of the screen 110. In the example depicted, the reference point is the upper left corner of the screen. The graphics objects 142, 144, 146 and 148 have a position relative to a reference point within the window 140. The size and position of each window, as well as graphics objects, are described with respect to the distance from the respective reference point in pixels and/or the relative height/width of the window or graphics object in pixels. The windows and graphics objects are drawn by a window drawing module 230 that is, in general, part of a windows manager 220 described below.

When the screen 110 is in a state labelled "B", the resolution of the screen 110 has been increased (e.g. 1400×1050) such that the screen 110 is now displaying a larger number of pixels in the same physical area, than when the screen 110 is in the state A, pixels in state B being of a smaller area than pixels in state A. However, the description of each window and/or graphic object does not change, and the distance from the respective reference point and/or the relative height/width are still described using the same number of pixels used to describe the window and/or graphic object when the screen 110 is in the state A. Hence, each window and/or graphics object appears smaller in size in state B, and the position of each shifts such that it appears closer to the reference point. A user may reposition and resize the windows using a mouse, as known to one of skill in the art, but the original position and size may be challenging to satisfactorily match.

When the screen 110 is in a state labelled "C", the resolution of the screen 110 has been decreased (e.g. 800×600) such that the screen 110 is now displaying a smaller number of pixels in the same physical area, than when the screen 110 is in the state A, pixels in state C being of a larger area than pixels in state A. However, as in the change from state A to state B, the description of each window and/or graphic object does not change, and the distance from the respective reference point and/or the relative height/width are still described using the same number of pixels used to describe the window and/or graphic object when the screen 110 is in the state A. Hence, each window and/or graphics object appears larger in size in state C, and the position of each shifts such that it appears farther from the reference point. Furthermore, it will be appreciated from FIG. 1, that window 140 as displayed in state C, is now of a relative position and size that is not compatible with the resolution of state C: the entirety of the window 140 is not displayed on the screen 110, with a lower portion of the window 140, and associated graphics objects 142, 144, 146 and 148, being cut off by the bottom edge of the screen 110. The right most portion of the graphic object 148 is also cut off by the right edge of the screen 110. A user may reposition and resize the windows using a mouse, as known to one of skill in the art, but the original position and size may be challenging to satisfactorily match.

Figure 2:
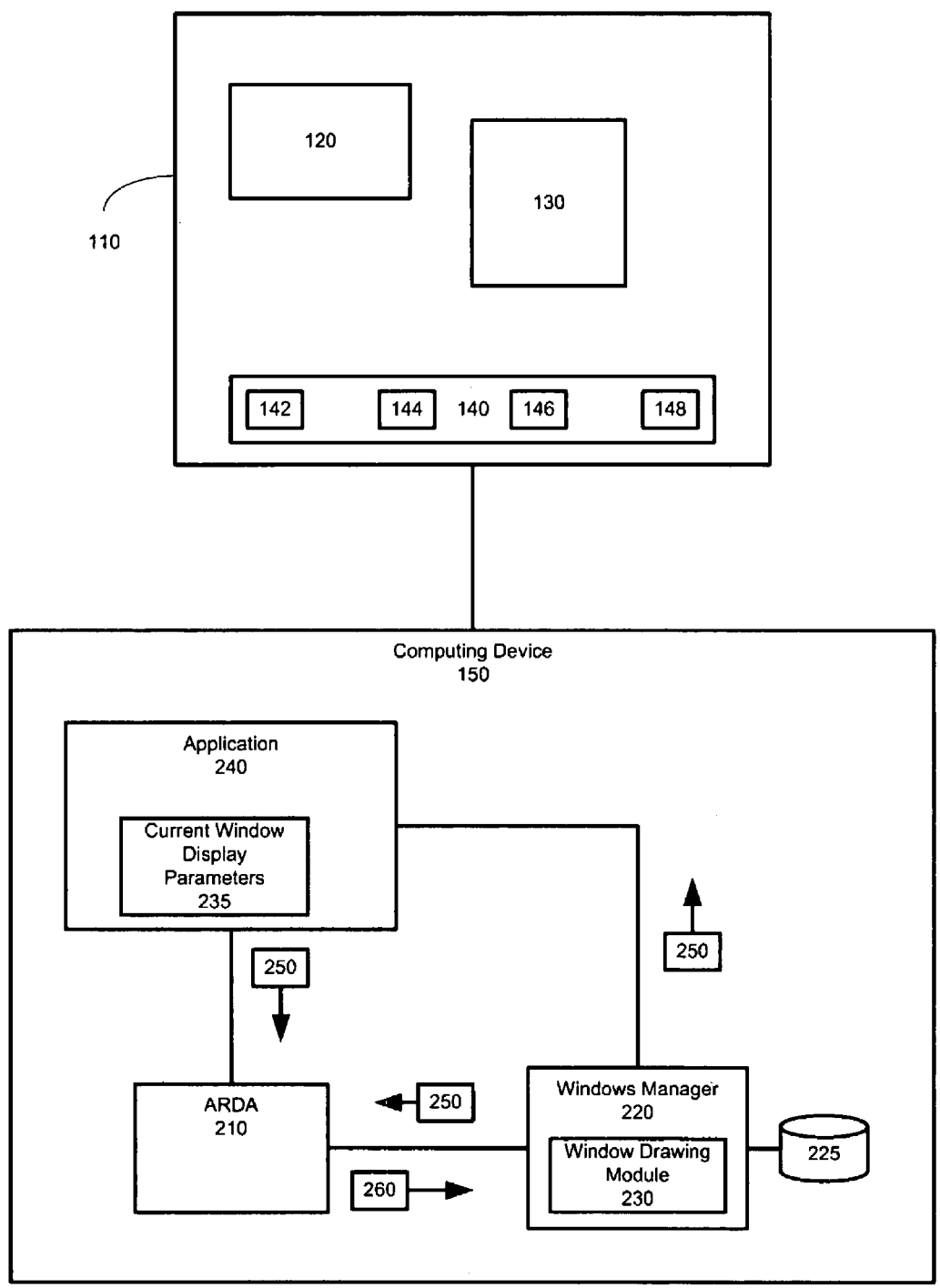
FIG. 2 depicts a system for maintaining a visual appearance of a window displayed on a screen when a resolution of the screen changes, according to a non-limiting embodiment.

FIG. 2 depicts a system for maintaining a visual appearance of a window displayed on the screen 110 after a change in a resolution of the screen 110, according to a non-limiting embodiment. An automatic resize detection application (ARDA) 210 is in communication with a windows manager 220 of the operating system of the computing device 150 which is generating the image displayed on the screen 110 via the window drawing module 230. The windows manager 220 is enabled to manage the windows displayed on the screen 110, for example the windows 120, 130 and 140, and is in communication with each application associated with a window, for example an application 240. Each application associated with a window is, in general, able to register with the windows manager 220 when the application is initiated, and the windows manager 220 maintains a record 225 of the windows on the screen 110, the record 225 comprising an identifier of each window, as well as data associated with each window. The windows manager 220 may then exchange data with each application associated with a window, in the general course of its window management duties. In a non-limiting example, the windows manager 220 is in further communication with the image management elements (not depicted) of the computing device 150 and is apprised of events that may affect windows displayed on the screen 110, for example changes in the resolution of the screen 110; the windows manager 220 may then transmit data to each application associated with a window to apprise them of the event.

The ARDA 210, the windows manager 220, the record 225, and the application 240 are stored as software elements in the memory 165, and processed by the CPU 160 to effect the functionality in each of the software elements.

The ARDA 210 is in further communication with the window drawing module 230 via the windows manager 220. The window drawing module 230 is enabled to draw the window associated with the application 240. In a non-limiting embodiment, the window 140 of FIG. 1 comprises the window associated with the application 240, however a person of skill in the art will understand that each window displayed on the screen is associated with an application, and embodiments are not to be limited to window 140. The window 140 acts as a graphic user interface (GUI) to the application 240.

In some embodiments, the ARDA 210 is a stand-alone application (as depicted), while in other embodiments the application 240 further includes the ARDA 210. The ARDA 210 is enabled to maintain the visual appearance of the window with which the application 240 is associated, after a change in a resolution of the screen 110, as described below with reference to FIG. 3.

The ARDA 210 may be in communication with a plurality of applications associated with windows, the plurality of applications comprising the application 240. In some embodiments, the ARDA 210 may be enabled to maintain the visual appearance of each window associated with each of the applications, while in other embodiments, the ARDA 210 may be enabled to maintain the visual appearance of the windows of a sub-set of the plurality of applications. In these embodiments, the ARDA 210 may maintain a record of windows whose visual appearance is to be maintained after a change in resolution of the screen 110. In some of these embodiments, the ARDA 210 polls each window when the ARDA 210 is initiated to determine if each window is a window whose visual appearance is to be maintained after a change in resolution of the screen 110. In these embodiments, an indication that the visual appearance of the window is to be maintained after a change in resolution of the screen 110 may be set as a property of the window, for example by a developer of the application with which the window is associated.

In some of these embodiments, windows that are opened after the ARDA 210 is initiated may be enabled to register with the ARDA 210, while in other of these embodiments, the ARDA 210 polls each window as it is opened. In yet further embodiments, the record 225 comprises identifiers of windows whose visual appearance is to be maintained after a change in resolution of the screen 110, and the ARDA 210 communicates with the windows manager 220 to determine which windows' visual appearance to maintain after a change in resolution of the screen 110. The identifiers of windows whose visual appearance is to be maintained after a change in resolution of the screen 110 may be obtained when each window registers with the windows manager 220, for example by determining the properties of each window.

The application 240 further comprises current window display parameters 235 of the window associated with the application 240. In a non-limiting embodiment, the current window display parameters 235 comprise current visual parameters of the window, including but not limited to position parameters of the window 140 relative to a reference point (for example, a corner, point on an edge, or the centre point) of the screen 110, in pixels, and size parameters of the window 140, in pixels, or any other unit of measure that may be used to describe digital imagery. In some embodiments, the position parameters comprise a vertical position and a horizontal position of a reference point on the window 140 from the reference point on the screen 110. The reference point on the window 140 may comprise a corner of the window 140, a point on an edge of window 140, or the centre point of the window 140. In some embodiments, the size parameters of the window 140 may comprise the height and width of the window 140. Other formats for expressing the position parameters and the size parameters will occur to a person of skill in the art. In some embodiments, the current window display parameters 235 may also comprise other information pertaining to the display of the window 140, for example the current resolution of the screen 110.

Upon initiation of the application 240, the windows manager 220 queries the application 240 for the current window display parameters 235, and subsequently the window drawing module 230 draws the window 140 by processing the current window display parameters 235 to draw the window 140 according to the position and size parameters. In some embodiments, the user may be permitted to reposition and/or resize the window 140 using a cursor to drag the window and corners and/or edges of the window to a new position or size. In some of these embodiments, the current window display parameters 235 are updated by the windows manager 220 (e.g. the window drawing module 230 captures the new window display parameters and the new window display parameters are transmitted to the application 240), such that if the window 140 is closed and reopened, the window 140 will have the same visual appearance as when it was closed. In other embodiments, the current window display parameters 235 are not updated when the window 140 is repositioned or resized, the window 140 having the same visual appearance each time it is opened. In yet further embodiments, the user is denied permission to resize and/or reposition the window 140. In some embodiments, the permissions granted to the user for each window may be stored in association with the application 240, while in other embodiments, the permissions are stored in record 225. Furthermore, in some embodiments, at least a portion of the window display parameters 235 may be stored within the record 225, in association with the window 140; in these embodiments, the at least a portion of the current window display parameters 235 are transmitted to the windows manager 220 when the application 240 is registered with the windows manager 220. Further, in these embodiments, if the current windows display parameters 235 are updated, the at least a portion of the current windows display parameters 235 stored in the record 225 by transmitting the updated values to the windows manager 220.

The application 240 is also in communication with the windows manager 220 and is enabled to exchange data with the windows manager 220, for example to receive a display change message 250 from the windows manager 220, the display change message 250 for indicating that the resolution of the screen 110 is to be changed, and that the window drawing module 230 will redraw the window 140 once the resolution has changed. In the absence of the ARDA 210, this results in the screen in state B or state C as depicted in FIG. 1.

Figure 3:
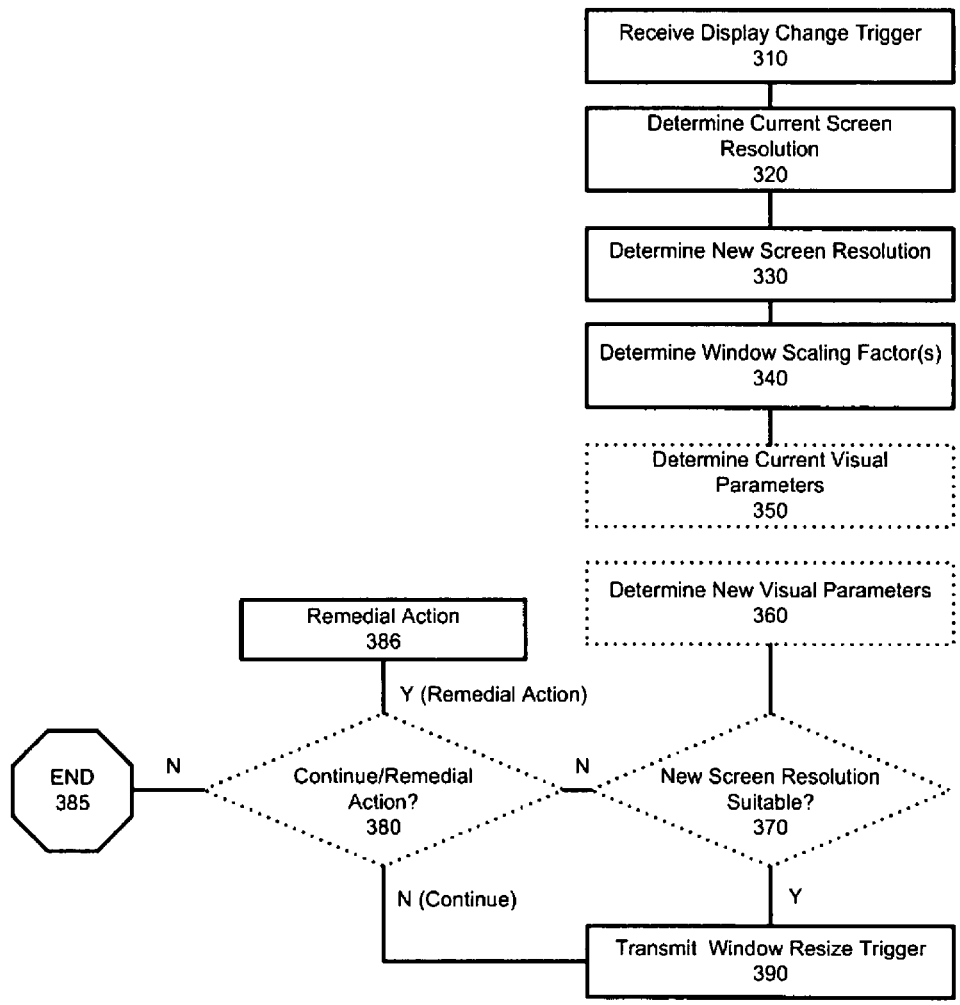
FIG. 3 depicts a method for maintaining a visual appearance of a window displayed on a screen when a resolution of the screen changes, according to a non-limiting embodiment.

Turning now to FIG. 3, which depicts a method for maintaining a visual appearance of a window displayed on the screen 110 after a change in a resolution of the screen 110. In a non-limiting embodiment, the method of FIG. 3 may be implemented within the ARDA 210, when the ARDA 210 is processed by the CPU 160. The method of FIG. 3 will be described with further reference to FIG. 2, to more fully illustrate the method of FIG. 3.

At step 310, the ARDA 210 receives the display change message 250. It will be recalled that the windows manager 220 is in communication with the image management elements (not depicted) of the computing device 150 and is apprised of events that may affect windows displayed on the screen 110. Hence when a change in resolution of the screen 110 is to occur, the windows manager 220 is apprised of this by the image management elements and, in response, the windows manager 220 generates the display change message 250 for transmission to the applications associated with open windows, to inform them that they will have to be redrawn.

In some embodiments, the ARDA 210 receives the display change message 250 from the windows manager 220. In other embodiments, the ARDA 210 receives the display change message 250 from the windows manager 220 via the application 240. In embodiments where the application 240 comprises the ARDA 210, the ARDA 210 receives the display change message 250 when the windows manager 220 transmits the display change message 250 to all the applications associated with open windows, including but not limited to open windows which have been minimized. In some embodiments, where the ARDA 210 is a stand alone application, the application 240 may be enabled to transmit the display change message 250 to the ARDA 210 when it is received from the windows manager 220. In other embodiments, where the ARDA 210 is a stand alone application, the ARDA 210 may be enabled to register with the windows manager 220, for example upon initiation of the ARDA 210, to receive the display change message 250 directly from the windows manager 220.

At step 320, the ARDA 210 determines the current resolution of the screen 110. In some embodiments, the current screen resolution is stored at the application 240, for example within the window display parameters 235. In other embodiments, the current screen resolution is stored at the windows manager 220, for example in the record 225. In yet further embodiments, the current screen resolution may be stored in association with another element of the computing device 150, for example the image management elements. In further embodiments, the current resolution of the screen may be stored in association with the ARDA 210. In embodiments where the current screen resolution is not stored at the ARDA 210, the ARDA 210 determines the current screen resolution by querying the appropriate element of the computing device 150 for the current screen resolution. In embodiments where the current screen resolution is stored at the ARDA 210, the ARDA 210 may determine the current screen resolution via a similar querying process upon initiation of the ARDA 210. In embodiments where the application 240 comprises the ARDA 210, the ARDA 210 may determine the current screen resolution by processing the window display parameters 235, or by querying the appropriate element of the computing device 150.

At step 330, the ARDA 210 determines the new screen resolution. In some embodiments, the display change message 250 comprises the new screen resolution, and the ARDA 210 determines the new screen resolution by processing the display change message 250. In some embodiments, the ARDA 210 determines the new screen resolution by querying the windows manager 220. In yet further embodiments, the ARDA 210 determines the new screen resolution by querying another appropriate element of the computing device 150, for example the image management elements.

At step 340, the ARDA 340 determines at least one window scaling factor by processing the current screen resolution and the new screen resolution. In a non-limiting example, the resolution of the screen 110 may be represented by H×W, wherein H comprises a vertical resolution (i.e. the height), in pixels, of the image displayed on the screen 110, and W comprises a horizontal resolution (i.e. the width), in pixels, of the image displayed on the screen. Hence, the current screen resolution may be represented by $H_C \times W_C$. $H_C$ comprises a current vertical resolution of the current image displayed on the screen 110. In some embodiments, the current vertical resolution comprises the height, in pixels, of the current image displayed on the screen 110. $W_C$ comprises a current horizontal resolution of the current image displayed on the screen 110. In some embodiments, the current horizontal resolution comprises the width, in pixels, of the current image displayed on the screen. The new screen resolution may be represented by $H_N \times W_N$, wherein $H_N$ comprises a new vertical resolution, for example a new height, in pixels, of the new image to be displayed on the screen 110, and $W_N$ comprises a new horizontal resolution, for example the width, in pixels, of the new image to be displayed on the screen.

Hence, if the visual appearance of the window 140 is to be maintained when the resolution of the screen 110 changes from the current screen resolution to the new screen resolution, the vertical position of the window 140 and the height of the window 140 is scaled by a vertical scaling factor $H_N/H_C$, and the horizontal position of the window 140 and the width of the window 140 is scaled by a horizontal scaling factor $W_N/W_C$. In some embodiments, $H_N/H_C = W_N/W_C$ the change in vertical resolution is similar to the change in horizontal resolution, and hence a single scaling factor (e.g. $H_N/H_C$ or $W_N/W_C$) is sufficient to describe how the window 140 is to be scaled to maintain the visual appearance of the window displayed on the screen 110 after a change in a resolution of the screen 110. Similarly, in other embodiments, $H_N = W_N$ and $H_C=W_C$, and hence a single scaling factor (e.g. $H_N/H_C$ or $W_N/W_C$) is sufficient to describe how the window 140 is to be scaled to maintain the visual appearance of the window displayed on the screen 110 after a change in a resolution of the screen 110. Furthermore, in these embodiments, either $H_N/H_C$ or $W_N/W_C$ may be calculated without having to calculate the other.

In some embodiments, at step 350, the ARDA 210 determines the current visual parameters. In embodiments where the ARDA 210 is configured to maintain the visual appearance of a plurality of windows when the resolution of screen 110 changes from a current resolution to a new resolution, the ARDA 210 determines the current visual parameters of each of the plurality of windows.

In some embodiments the ARDA 210 determines the current visual display parameter by querying the application 240. The application 240 processes the query, and returns the current visual display parameters by processing the window display parameters 235. In embodiments where the application 240 comprises the ARDA 210, the ARDA 210 determines the current visual parameters 235 by processing the window display parameters 235. In other embodiments where at least a portion of the current window display parameters 235 are stored at the record 225, the ARDA 210 may determine the current visual display parameters by querying the windows manager 220.

In embodiments where the ARDA 210 determines the current visual parameters, the ARDA 210 further determines new visual display parameters at step 360. In these embodiments, the current visual display parameters are processed in conjunction with the appropriate scaling factor (or factors) to determine the new visual display parameters. For example, the current visual display parameters may comprise a current vertical position $VP_C$, a current horizontal position $HP_C$, a current height $HT_C$ and a current width $WD_C$ of the window 140. A new vertical position $VP_N$ and a new height $HT_N$ may be determined by multiplying the $VP_C$ and the $HT_C$ by the vertical scaling factor:

$$VP_N = H_N/H_C \times VP_C$$

$$HT_N = H_N/H_C \times HT_C$$

Similarly, a new horizontal position $HP_N$ and a new width $WD_N$ may be determined by multiplying the $HP_C$ and the $WD_C$ by the vertical scaling factor:

$$HP_N = W_N/W_C \times HP_C$$

$$WD_N = H_N/H_C \times WD_C$$

The new vertical position $VP_N$ and the new horizontal position $HP_N$ are representative of the position of the window 140 on the screen 110, after the resolution of screen 110 has changed to the new resolution, such that the window 140 has a position similar to its position on the screen 110, when the resolution of the screen 110 is the current resolution. Similarly, the new height $HT_N$ and the new width $WD_C$ are representative of the size of the window 140 on the screen 110, after the resolution of screen 110 has changed to the new resolution, such that the window 140 has a size similar to its position on the screen 110, when the resolution of the screen 110 is the current resolution. Hence the new visual display parameters comprise the $VP_N$, the $HT_N$, the $HP_N$ and the $WD_N$.

In some embodiments, the ARDA 210 may determine at step 370 if the new screen resolution is suitable for displaying the window 140 and/or the graphic objects 142, 144, 146 and 148 within the window 140, such that the window 140 maintains its visual appearance after the resolution of the screen 110 has changed to the new resolution. For example, if the resolution of the screen 110 is changing to a resolution lower than the current resolution, it may not be possible to adequately display details of the graphic objects 142, 144, 146, and 148 in the low resolution. For example, in some embodiments, the graphic objects 142, 144, 146, and 148 may not scale to what a human would assess as useable. In some of these embodiments, a font displayed the graphic objects 142, 144, 146, and may be readable.

Hence, in some embodiments, the current windows display parameters 235 may further comprise a minimum resolution, below which the visual appearance of the window 140 may not be maintained. The minimum resolution may be set by a developer of the application 140. The ARDA 210 may determine the minimum resolution by querying the application 240. In embodiments, where the ARDA 210 queries the application 240 at step 350 to determine the current visual parameters, the ARDA 210 may combine the query for the current visual parameters and the minimum resolution. In these embodiments, once the ARDA 210 has determined the minimum resolution, the ARDA 210 may determine if the new screen resolution is suitable by comparing the new screen resolution to the minimum resolution.

If the new screen resolution is not suitable (i.e. lower than the minimum resolution), the ARDA 210 may determine, at step 380, if a further action is to occur to maintain the visual appearance of the window 140 when a change in resolution of the screen 110 occurs, by querying the user of the computing device. In some of the these embodiments, querying the user comprises displaying a new window on the screen 110 warning the user that the new resolution will negatively impact the window 140, and asking if the user wishes to continue. If not, the ARDA 210 does not proceed with further action, and processing ends at step 385. In some of these embodiments, a trigger may be transmitted to the imaging elements to stop the change in resolution of the screen 110 from occurring. In other embodiments, the change in resolution continues, but no action is taken to maintain the visual appearance of the window 140 displayed on the screen 110.

In some embodiments, at step 380, the user may be further queried if remedial action is to occur if the change if the new screen resolution is not suitable. If so, the remedial action occurs at step 386. In some non-limiting embodiments, the remedial action comprises informing the user of the minimum resolution below which the visual appearance of the window 140 may not be maintained, and querying the user if he/she desires that the resolution of the screen 110 be set to the minimum resolution. In these embodiments, a trigger may be transmitted to the imaging elements to cause the new screen resolution to be set to the minimum resolution. In some of these embodiments, the method of FIG. 3 may be reinvoked when a new display change trigger is generated by the windows manager 220. In other non-limiting embodiments, the user may be queried if they prefer another resolution. In some these embodiments, a trigger may be transmitted to the imaging elements to cause the new screen resolution to be set to a resolution entered by the user, while in other embodiments, a trigger may be transmitted to the imaging elements to cause the imaging elements to query the user if a new resolution is to occur.

In any event, if the user decides to continue, or in embodiments that do not comprise steps 370, 380, 385 and 386, at step 390 a window resize trigger 260 is transmitted to the window drawing module 230 (via the windows manager 220), to trigger the window drawing module 230 to redraw the window 140 after the resolution of the screen 110 has changed to the new screen resolution, to maintain the visual appearance of the window 140. In embodiments, where the vertical scaling factor is similar to the horizontal scaling factor, the window resize trigger 260 may comprises a single scaling factor similar to the horizontal and vertical scaling factors. In other embodiments the window resize trigger 260 comprises the vertical scaling factor and the horizontal scaling factor. In these embodiments, the window drawing module 230 is enabled to receive and process the window resize trigger 260 to extract the scaling factor or the vertical scaling factor and the horizontal scaling factor, and determine the new visual parameters, by processing the current windows display parameters 235, in a manner similar to that described with reference to step 360, above. The window drawing module 230 then redraws the window 140 using the new visual display parameters to maintain the visual appearance of the window 140 after the resolution of the screen 110 is set to the new resolution.

The window drawing module 230 is generally enabled to redraw the graphics objects 142, 144, 146 and 148 relative to the reference point of the window 140, as described above, maintaining the scale of the graphics objects 142, 144, 146 and 148 relative the size of the window 140. As the size of the redrawn window 140 is effectively similar before and after the change in resolution of the screen 110 from the current resolution to the new resolution, the visual appearance of the graphics objects 142, 144, 146 and 148 is maintained when the resolution of the screen 110 changes from the current resolution to the new resolution. In some embodiments, at least one of the graphics objects 142, 144, 146 and 148 may comprise text, the text being comprised of fonts. In these embodiments, the fonts may comprise true type fonts, which are enabled to maintain their visual appearance through resolution changes, as known to one of skill in the art. In other embodiments, the window drawing module 230 is enabled to scale the (e.g. the fonts) relative the to the reference point of the window 140, as described above, maintaining the scale of the text relative the size of the window 140. Hence the visual appearance of the text is maintained when the resolution of the screen 110 changes from the current resolution to the new resolution.

In embodiments of the method of FIG. 3 that include the steps 350 and 360, the windows resize trigger 260 comprises the new visual display parameters. In these embodiments, the window drawing module 230 is enabled to receive and process the window resize trigger 260 to extract the new visual parameters. The window drawing module 230 then redraws the window 140 using the new visual display parameters to maintain the visual appearance of the window 140 after the resolution of the screen 110 is set to the new resolution, in a manner similar to that described above.

Figure 4:
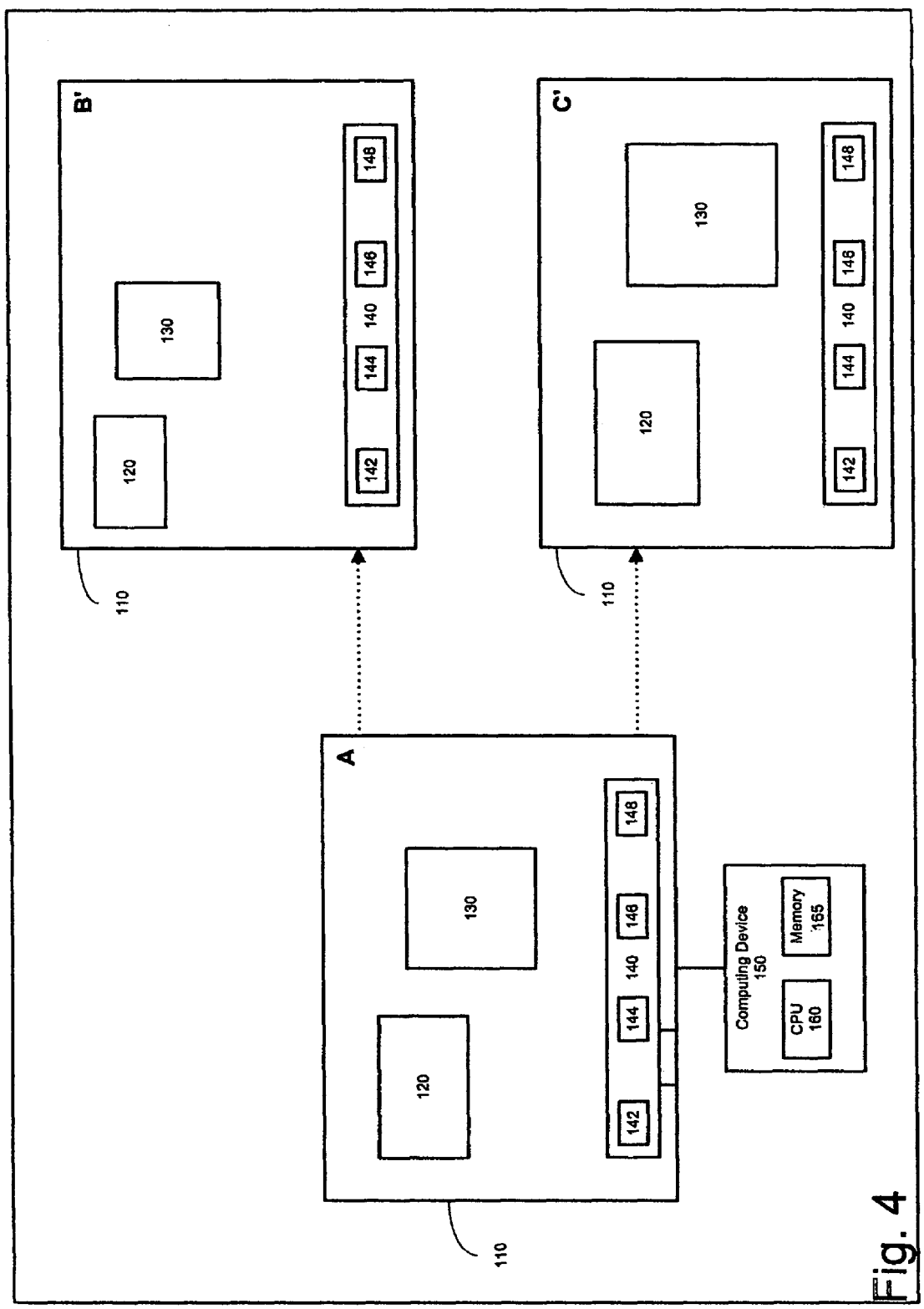
FIG. 4 depicts the effect of a change in the resolution of a screen on the visual appearance of a window displayed on the screen, when the method of FIG. 3 is used to maintain the visual appearance of the window, according to a non-limiting embodiment

FIG. 4 depicts the effect of a change in the resolution of the screen 110 on the visual appearance of the windows 120, 130 and 140 displayed on the screen 110, when the method of FIG. 3 of used to maintain the visual appearance of the window 140, according to non-limiting embodiments. Similar to FIG. 1, when the screen 110 is in a state labelled "A" in FIG. 1, the windows 120, 130 and 140 have a size and position relative to a reference point on the screen 110, for example an edge, corner or centre of the screen 110. The graphics objects 142, 144, 146 and 148 have a position relative to a reference point within the window 140. When the screen 110 is in a state labelled "B", the resolution of the screen 110 has been increased such that the screen 110 is now displaying a larger number of pixels in the same physical area, than when the screen 110 is in the state A, pixels in state B being of a smaller area than pixels in state A. When the screen 110 is in a state labelled "C", the resolution of the screen 110 has been decreased such that the screen 110 is now displaying a smaller number of pixels in the same physical area, than when the screen 110 is in the state A, pixels in state C being of a larger area than pixels in state A. When the method of FIG. 3 is applied to window 140, the visual appearance of the window 140 does not change if the resolution of the screen is increased or decreased: the position and size of the window 140 does not change with respect to the reference point on the screen 110, and the graphics objects do not change with respect the reference point in the window 140. However the visual appearance of the windows 120 and 130 may change significantly.

Those skilled in the art will appreciate that in some embodiments, the functionality of the ARDA 210 may be implemented using pre-programmed hardware or firmware elements (e.g., application specific integrated circuits (ASICs), electrically erasable programmable read-only memories (EEPROMs), etc.), or other related components. In other embodiments, the functionality of the ARDA 210 may be achieved using a computing apparatus that has access to a code memory (not shown) which stores computer-readable program code for operation of the computing apparatus. The computer-readable program code could be stored on a medium which is fixed, tangible and readable directly by these components, (e.g., removable diskette, CD-ROM, ROM, fixed disk, USB drive), or the computer-readable program code could be stored remotely but transmittable to these components via a modem or other interface device connected to a network (including, without limitation, the Internet) over a transmission medium. The transmission medium may be either a non-wireless medium (e.g., optical or analog communications lines) or a wireless medium (e.g., microwave, infrared, free-space optical or other transmission schemes) or a combination thereof.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

The invention claimed is:

1. A method of maintaining a visual appearance of at least one window displayed on a screen when a resolution of the screen changes from a current screen resolution to a new screen resolution, comprising, when a change in a vertical resolution is similar to a change in horizontal resolution, generating only one of a vertical scaling factor and a horizontal scaling factor, the vertical scaling factor being generated by dividing said new vertical resolution by said current vertical resolution and the horizontal scaling factor being generated by dividing said new horizontal resolution by said current horizontal resolution; and sending to a window drawing module a window resize trigger comprising a single scaling factor, the single scaling factor being similar to the generated one of the horizontal scaling factor or the vertical scaling factor;

wherein the single scaling factor is for generating new visual parameters by scaling current visual parameters, said new visual parameters for drawing the at least one window on the screen when the resolution changes from the current screen resolution to the new screen resolution, said window resize trigger triggering said drawing the at least one window on the screen using said new visual parameters when the resolution changes from said current screen resolution to said new screen resolution.

2. The method of claim 1, further comprising determining said current visual parameters and generating said new visual parameters by scaling said current visual parameters using said single scaling factor.

3. The method of claim 2, wherein said determining said current visual parameters comprises requesting said current visual parameters from one of an application associated with the at least one window and a windows manager.

4. The method of claim 1, wherein said current visual parameters comprise:
   a vertical position of a reference point associated with the at least one window relative to a reference point on the screen;
   a horizontal position of said reference point associated with the at least one window relative to said reference point on the screen;
   a height of the at least one window; and
   a width of the at least one window.

5. The method of claim 4, wherein said generating at least one scaling factor is based on said current screen resolution and said new screen resolution comprises generating a vertical scaling factor and a horizontal scaling factor, and said generating new visual parameters by scaling said current visual parameters comprises multiplying said vertical position of a reference point associated with the at least one window relative to a reference point on the screen, and said a height of the at least one window by said single scaling factor, and multiplying said horizontal position of said reference point associated with the at least one window relative to said reference point on the screen, and said width of the at least one window by said single scaling factor.

6. The method of claim 1, wherein units of said current visual parameters and said new visual parameters are pixels.

7. The method of claim 1 further comprising determining if said new screen resolution is suitable for maintaining the visual appearance of the at least one window displayed on the screen when the resolution changes from said current screen resolution to said new screen resolution.

8. The method of claim 7, further comprising determining a minimum resolution below which the visual appearance of the at least one window is negatively impacted, wherein said determining if said new screen resolution is suitable comprises determining if said new screen resolution is less than said minimum resolution.

9. The method of claim 8, wherein said determining said minimum resolution comprises requesting said minimum resolution from an application associated with the at least one window.

10. The method of claim 1, further comprising determining said current screen resolution by requesting said current screen resolution from one of an application associated with the at least one window and a windows manager.

11. The method of claim 1, further comprising receiving a display change message indicative that the resolution of the screen is to be changed, said display change message comprising the new screen resolution.

12. The method of claim 1, further comprising determining said new screen resolution by requesting said new screen resolution from one of an application associated with the at least one window and a windows manager.

13. The method of claim 1, wherein said windows resize trigger comprising said at least one scaling factor, and configured for triggering said window drawing module to determine said current visual parameters and generate said new visual parameters by scaling said current visual parameters using said at least one scaling factor.

14. A computing device for maintaining a visual appearance of at least one window displayed on a screen coupled to said computing device when a resolution of the screen changes from a current screen resolution to a new screen resolution, comprising,
   a memory for storing a windows manager, a window drawing module for drawing the at least one window, and an automatic resize detection application, said automatic resize detecting application configured for:
      when a change in a vertical resolution is similar to a change in horizontal resolution, generating only one of a vertical scaling factor and a horizontal scaling factor, the vertical scaling factor being generated by dividing said new vertical resolution by said current vertical resolution and the horizontal scaling factor being generated by dividing said new horizontal resolution by said current horizontal resolution; and
      sending to a window drawing module a window resize trigger comprising a single scaling factor, the single scaling factor being similar to the generated one of the horizontal scaling factor or the vertical scaling factor;
      wherein the single scaling factor is for generating new visual parameters by scaling current visual parameters, said new visual parameters for drawing the at least one window on the screen when the resolution changes from the current screen resolution to the new screen resolution, said window resize trigger triggering said window drawing module to draw the at least one window on the screen using said new visual parameters when the resolution changes from said current screen resolution to said new screen resolution; and
   a processor for processing said windows manager, said window drawing module, and said automatic resize detection application.

15. The computing device of claim 14, wherein said window drawing module is configured to determine said current visual parameters and generate said new visual parameters by scaling said current visual parameters using said scaling factor.

16. The computing device of claim 14, wherein said memory further stores an application comprising said automatic resize detection application.

17. The computing apparatus of claim 14, wherein said window drawing module is responsive to receipt of the window resize trigger to draw the at least one window on the screen.

* * * * *